(12) United States Patent
Giovenzana et al.

(10) Patent No.: US 8,711,506 B1
(45) Date of Patent: Apr. 29, 2014

(54) DISK DRIVE INCREASING CAPACITY BY ADJUSTING A SERVO GATE DURING WRITE OPERATIONS

(75) Inventors: Davide Giovenzana, Longmont, CO (US); John W. Vanlaanen, Louisville, CO (US); Prakash Balasubramaniam, Rancho Santa Margarita, CA (US); Teik Ee Yeo, Trabuco Canyon, CA (US); Guoxiao Guo, Irvine, CA (US); Honge Wang, Irvine, CA (US); Jie Yu, Irvine, CA (US); Philip S. Gordon, Santa Ana, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 47 days.

(21) Appl. No.: 13/485,373

(22) Filed: May 31, 2012

(51) Int. Cl.
*G11B 5/09* (2006.01)
(52) U.S. Cl.
USPC .............. 360/51; 360/49; 360/75; 360/77.08; 360/78.14
(58) Field of Classification Search
None
See application file for complete search history.

(56) References Cited

U.S. PATENT DOCUMENTS

| | | | |
|---|---|---|---|
| 5,784,216 A | 7/1998 | Zaharris | |
| 5,892,634 A * | 4/1999 | Ito et al. | 360/77.08 |
| 6,009,549 A | 12/1999 | Bliss et al. | |
| 6,265,868 B1 | 7/2001 | Richter | |
| 6,633,451 B1 * | 10/2003 | Chainer et al. | 360/75 |
| 6,680,609 B1 | 1/2004 | Fang et al. | |
| 6,950,259 B2 | 9/2005 | Osafune | |
| 7,046,465 B1 | 5/2006 | Kupferman | |
| 7,095,577 B1 | 8/2006 | Codilian et al. | |
| 7,119,537 B2 | 10/2006 | Che et al. | |
| 7,489,468 B2 * | 2/2009 | Ohinata et al. | 360/77.04 |
| 7,529,050 B2 | 5/2009 | Shen et al. | |
| 7,551,379 B2 | 6/2009 | Yu et al. | |
| 7,907,361 B2 | 3/2011 | Deng et al. | |
| 7,916,416 B1 | 3/2011 | Guo et al. | |
| 7,982,989 B1 | 7/2011 | Shi et al. | |

\* cited by examiner

*Primary Examiner* — Muhammad N Edun

(57) ABSTRACT

A disk drive is disclosed comprising a disk comprising a plurality of servo tracks defined by servo sectors. The disk drive further comprises a head comprising a read element offset linearly from a write element by a gap such that when the disk rotates, the read element reaches a servo sector before the write element. During a first operation, a first length of a beginning of the servo sector is read, and during a write operation, a second length of the beginning of the servo sector shorter than the first length is read to enable data to be written while the read element is over at least part of the servo sector.

30 Claims, 5 Drawing Sheets

US 8,711,506 B1

DISK DRIVE INCREASING CAPACITY BY ADJUSTING A SERVO GATE DURING WRITE OPERATIONS

BACKGROUND

Disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track and wedge address) which is read by the head and processed by a servo control system to control the velocity of the actuator arm as it seeks from track to track and establish rotational position.

FIG. 1 shows a prior art disk format 2 as comprising a number of servo tracks 4 defined by servo sectors $6_0$-$6_N$ recorded around the circumference of each servo track. Each servo sector $6_i$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address (Gray coded) and wedge address, used to position the head over a target data track during a seek operation and monitor the rotational position with respect to a reference index-wedge. Each servo sector $4_i$ further comprises groups of servo bursts 14 (A,B,C,D in the example shown), which are recorded with precise intervals and offsets relative to the track centerlines. The servo bursts 14 provide fine head position information used for centerline tracking while accessing a data track during write/read operations.

DETAILED DESCRIPTION

Figures 2A, 2B:
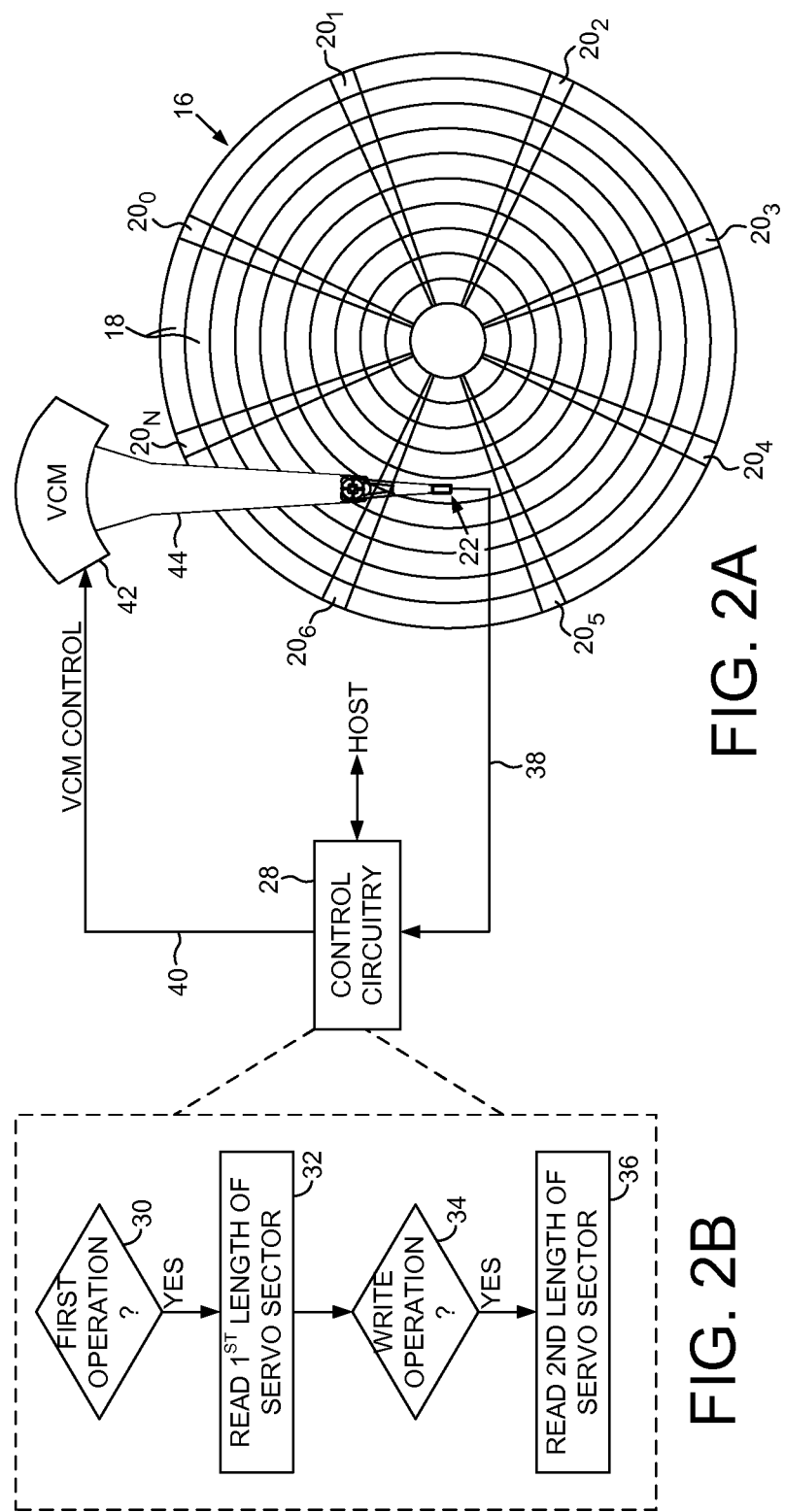
FIG. 2A shows a disk drive according to an embodiment of the present invention comprising a head actuated over a disk.
FIG. 2B is a flow diagram according to an embodiment of the present invention wherein during a first operation, a first length of a beginning of a servo sector is read, and during a write operation, a second (shorter) length of the beginning of the servo sector is read.
Figure 3A:
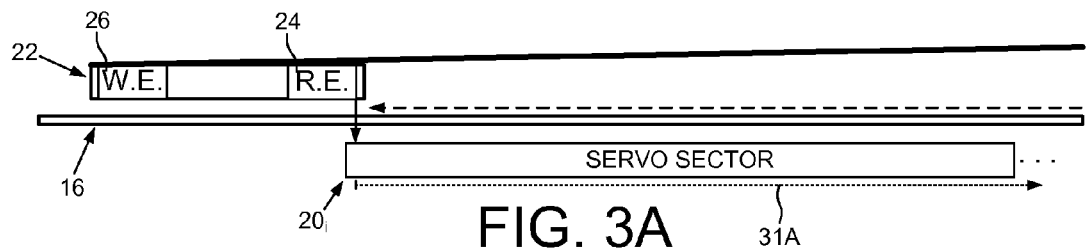
FIG. 3A illustrates a first operation (e.g., a seek operation) wherein substantially the entire servo sector is read according to an embodiment of the present invention.
Figure 3B:
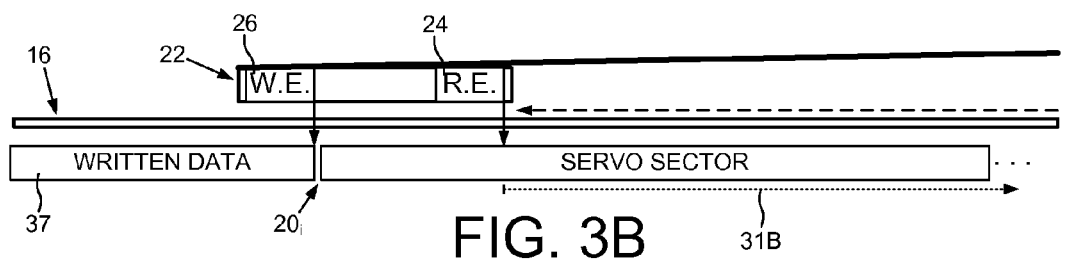
FIG. 3B illustrates a write operation wherein a first part of the servo sector is not read to allow the write data to extend up to the beginning of the servo sector according to an embodiment of the present invention.

FIG. 2A shows a disk drive according to an embodiment of the present invention comprising a disk 16 having a plurality of servo tracks 18 defined by servo sectors $20_0$-$20_N$. The disk drive further comprises a head 22 comprising a read element 24 offset linearly from a write element 26 (FIG. 3A) by a gap such that when the disk 16 rotates, the read element 24 reaches a servo sector $20_i$ before the write element 26. The disk drive further comprises control circuitry 28 operable to execute the flow diagram of FIG. 2B, wherein during a first operation (block 30), a first length 31A of a beginning of the servo sector $20_i$ is read (block 32) as illustrated in FIG. 3A, and during a write operation (block 34), a second length 31B of the beginning of the servo sector shorter than the first length is read (block 36) as illustrated in FIG. 3B to enable data 37 to be written while the read element 24 is over at least part of the servo sector $20_i$.

Figure 1:
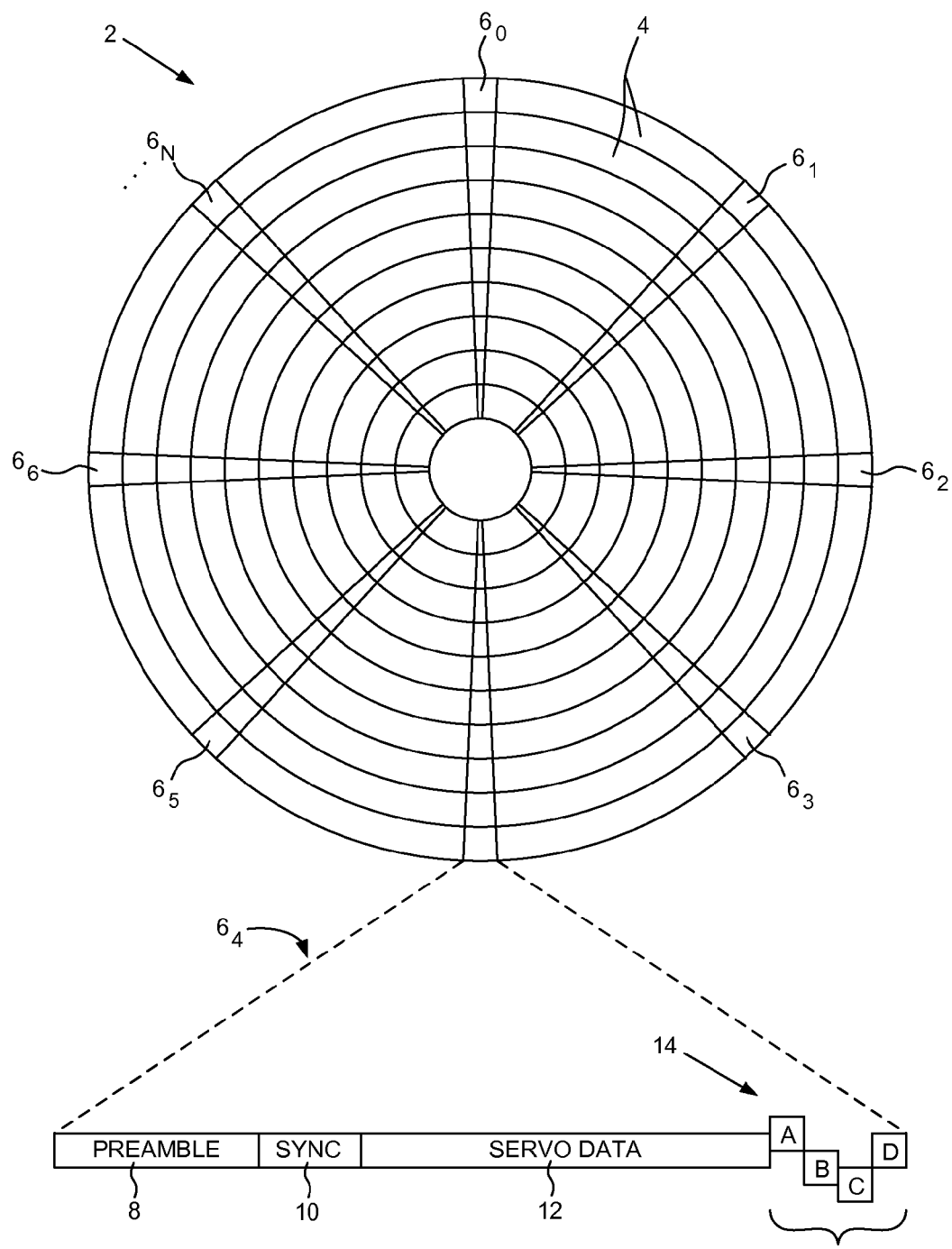
FIG. 1 shows a prior art disk format comprising a plurality of servo tracks defined by embedded servo sectors.

In the embodiment of FIG. 2A, the disk 16 comprises embedded servo sectors $20_0$-$20_N$ that define the servo tracks 18. The control circuitry 28 processes a read signal 38 emanating from the head 22 to demodulate the servo sectors $20_0$-$20_N$ and generate a position error signal (PES) representing an error between the actual position of the head and a target position relative to a target track. The control circuitry 28 filters the PES using suitable compensation filters to generate a control signal 40 applied to a voice coil motor (VCM) 42 which rotates an actuator arm 44 about a pivot, thereby actuating the head 22 radially over the disk 16 in a direction that reduces the PES. The servo sectors $20_0$-$20_N$ may comprise any suitable position information, such as a track and wedge address for coarse positioning and servo bursts for fine positioning as described above with reference to FIG. 1. The servo bursts may comprise any suitable pattern, such as an amplitude based servo pattern as shown in FIG. 1, or a suitable phase based servo pattern.

Referring again to FIG. 3B, in one embodiment a difference between the first length of a servo sector read during the first operation (FIG. 3A) and the second length of the servo sector read during a write operation (FIG. 3B) is substantially equal to the gap between the read element 24 and the write element 26. In this manner, the data 37 may be written up to the beginning of the servo sector $20_i$ before pausing the write operation in order to read the servo sector $20_i$.

The first operation wherein substantially the entire length (first length) of the servo sector $20_i$ is read may comprise any suitable operation, such as when seeking the head 22 to a target servo track, or when performing a read operation. In another embodiment described below, the first operation may comprise a resync operation wherein the control circuitry 28 attempts to resynchronize to the servo sectors after aborting a write operation. During the first operation (e.g., seek, read, resync, etc.), the control circuitry 28 may read substantially the entire servo sector since data is not being written up to the beginning of the servo sector (as shown in FIG. 3A). As described below, the beginning of a servo sector may store information that is not needed during a write operation, or the beginning of a servo sector may store information that makes the first operation (e.g., read operation) more reliable.

Figure 4:
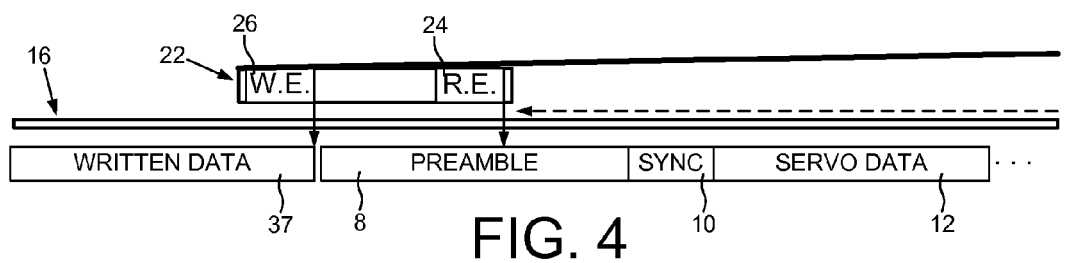
FIG. 4 shows an embodiment of the present invention wherein the beginning of the servo sector comprises a servo preamble.

The beginning of a servo sector $20_i$ in FIG. 3B may comprise any suitable information. In an embodiment shown in FIG. 4, the beginning of the servo sector $20_i$ comprises a servo preamble 8. During the first operation, the read element 24 reads substantially the entire servo preamble 8 which increases the likelihood of successfully synchronizing to the servo sector $20_i$. During a write operation, the head 22 is already tracking fairly reliably on the servo tracks, so it is typically unnecessary to read the entire servo preamble 8 in order to synchronize to the servo sector $20_i$. This enables delaying the read of the servo sector so that data 37 may be written up to the beginning of the servo sector as shown in FIG. 4.

Figure 5:
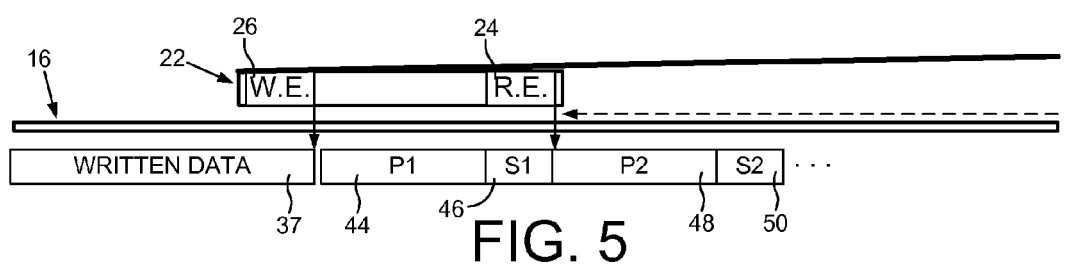
FIG. 5 shows an embodiment of the present invention wherein the beginning of the servo sector comprises a first servo preamble and a first sync mark, and a second servo preamble and a second sync mark.

FIG. 5 shows another embodiment of the present invention wherein the beginning of the servo sector $20_i$ comprises a first servo preamble 44 and a first sync mark 46, and a second servo preamble 48 and a second sync mark 50. In one embodiment, the first servo preamble 44 and the first sync mark 46 are not read during the write operation, and instead the second servo preamble 48 and second sync mark 50 are read in order to synchronize to the servo sector $20_i$. During the first operation (non-write operation), both the first and second servo preambles/sync marks are read in order to realize the benefit of redundancy. For example, if an error occurs that prevents reading the second servo preamble and/or second sync mark, it may still be possible to read the first servo preamble and/or first sync mark in order to synchronize to the servo sector $20_i$.

Figure 6:
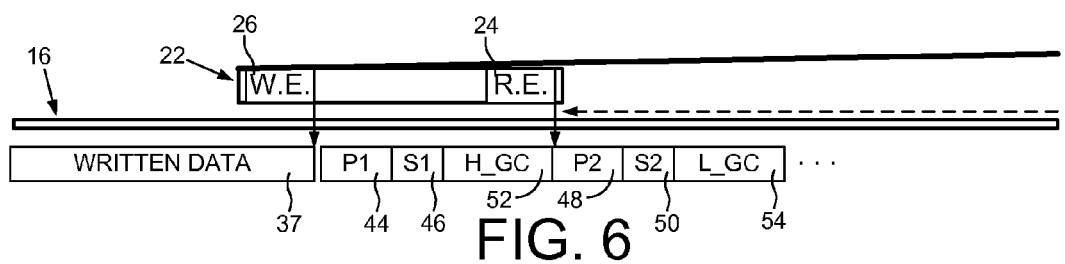
FIG. 6 shows an embodiment of the present invention wherein the beginning of the servo sector comprises a high order Gray code address and a low order Gray code address.

FIG. 6 shows an embodiment of the present invention wherein the first servo preamble 44 and first sync mark 46 are used to synchronize to a high order Gray code address 52, and the second servo preamble 48 and second sync mark 50 are used to synchronize to a low order Gray code address 54. During a write operation, it is typically unnecessary to read the high order bits of the Gray code address since the head is tracking on a servo track (and the high order bits are not changing). Therefore, during a write operation the high order Gray code address 52 is not read to allow the data 37 to be written up to the beginning of the servo sector $20_i$.

Figure 7:
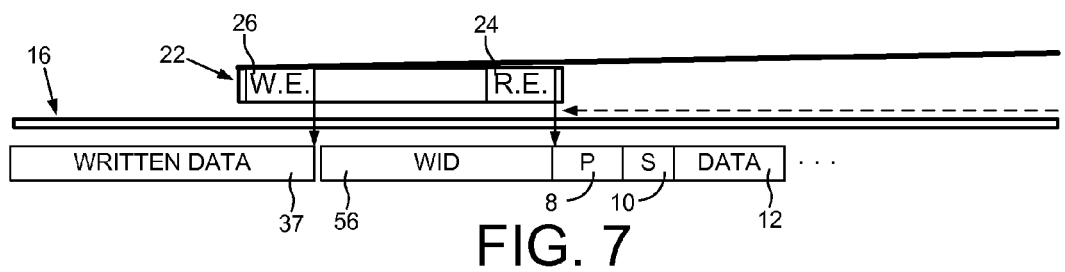
FIG. 7 shows an embodiment of the present invention wherein the beginning of the servo sector comprises at least part of a wedge ID (WID).

FIG. 7 shows an embodiment of the present invention wherein the beginning of a servo sector $20_i$ may comprise all or part of a wedge ID (WID) 56 that identifies the sequence of the servo sectors around the circumference of the disk. During a write operation, the head is tracking on a servo track and therefore it is typically unnecessary to read the full wedge ID 56 (e.g., skip the wedge ID 56 entirely or read only a low order part of the wedge ID 56). FIG. 7 also illustrates an embodiment wherein the servo preamble 8 may not be recorded at the beginning of a servo sector $20_i$. In this embodiment, the information recorded at the beginning of a servo sector $20_i$ (e.g., all or part of a wedge ID 56 and/or high order Gray code address) may be synchronized in reverse after synchronizing to the servo preamble 8 and detecting the sync mark 10. For example, the read signal samples representing the beginning of the servo sector $20_i$ may be buffered and then synchronized in reverse using any suitable interpolation technique after synchronizing to the servo preamble 8 and detecting the sync mark 10.

The beginning of the servo sector $20_i$ may store information other than a wedge ID, such as repeatable runout (RRO) information used to compensate for RRO during read operations. In general, the beginning of the servo sector $20_i$ may store any suitable information not typically needed during a write operation.

Figure 8:
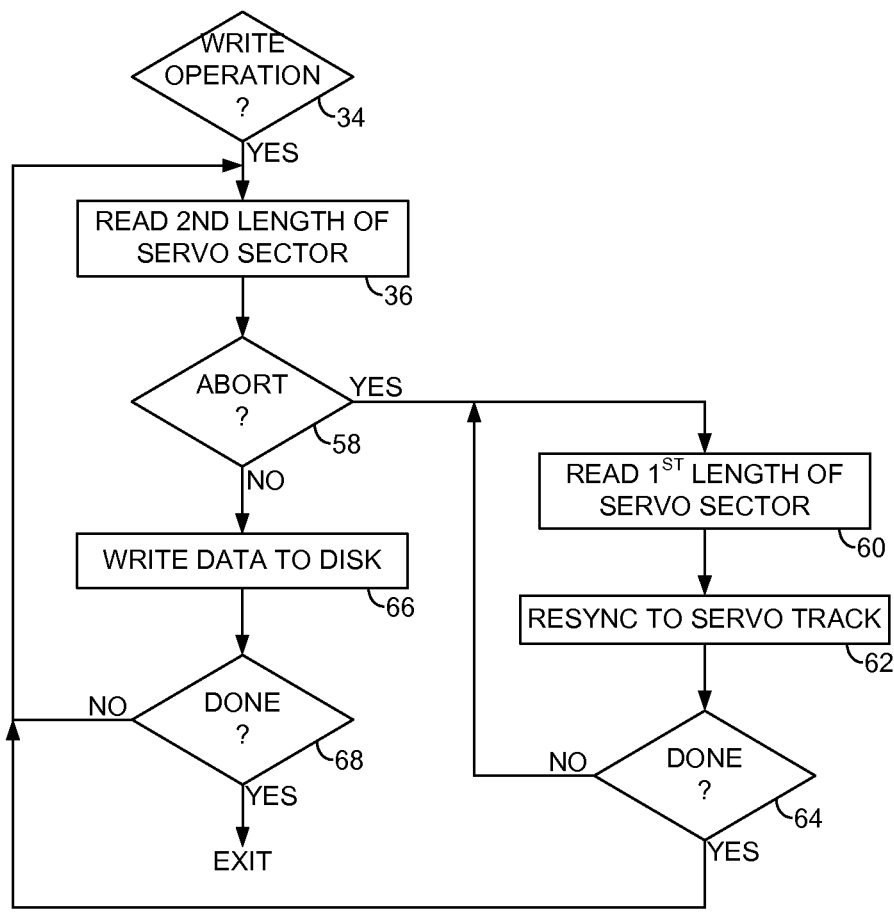
FIG. 8 is a flow diagram according to an embodiment of the present invention wherein when a write operation is aborted, the disk drive resynchronizes to the servo sectors by reading the first length of the servo sectors.

FIG. 8 is a flow diagram according to an embodiment of the present invention wherein during a write operation (block 34) the second (shorter) length of the servo sector is read (block 36; FIG. 3B). If there is a problem during the write operation, such as a problem with synchronizing to a servo sector, the write operation is aborted (block 58). The first (longer) length of the servo sector is then read (block 60) in order to resynchronize to the servo sectors (block 62). In one embodiment, reading the first (longer) length of the servo sectors helps to resynchronize, for example, by reading more of the servo preamble. This part of the flow diagram is repeated (block 64) starting with block 60 until resynchronization to the servo sectors is successful. Once resynchronized to the servo sectors, the flow diagram continues from block 36 wherein the second (shorter) length of the servo sector is read (block 60) while writing data to the disk (block 66). The flow diagram is repeated until the write operation completes successfully (block 68), wherein there may be multiple aborts and resync operations before the write operation completes successfully.

Figure 9A:
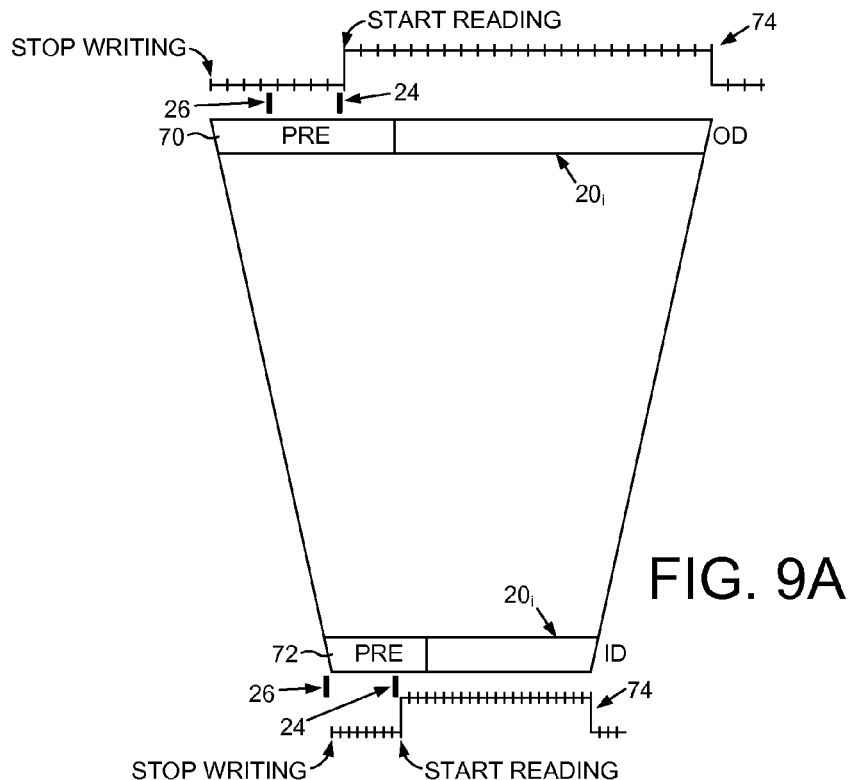
FIGS. 9A and 9B illustrate an embodiment of the present invention wherein the shorter length of the servo sector that is read during a write operation remains constant from a first radius of the disk to a second radius of the disk even though the reader/writer gap varies relative to the length of a servo sector.

In one embodiment, the percentage of a servo sector that is not read during a write operation is substantially the same over at least part of the disk radius even though the reader/writer gap may change relative to the servo sectors. FIG. 9A illustrates an example of this embodiment wherein a beginning part of the servo sector $20_i$ is not read during a write operation. The servo sectors are recorded at a constant data rate over at least part of the disk from a first diameter 70 to a second diameter 72. Because the circumference of the servo tracks gets smaller toward the inner diameter of the disk, the servo sectors get shorter and therefore form a wedge shape as shown in FIG. 9A. This causes the reader/writer gap to increase relative to the servo sectors toward the inner diameter (ID) of the disk and to decrease toward the outer diameter (OD). In one embodiment, the percentage of a servo sector that is not read during a write operation is based on the reader/writer gap near the ID 72. This is illustrated in FIG. 9A wherein the writing stops when the write element 26 reaches the beginning of the servo sector $20_i$ (and the read of the servo sector begins). At the OD 70, the writing stops when the write element 26 reaches the beginning of the servo sector $20_i$, but the reading is delayed until the read element 24 reaches the same percentage offset within the servo sector $20_i$ as when it is at the ID 72. This embodiment may help simplify the timing algorithm responsible for enabling the reading of a servo sector relative to a servo clock synchronized to the data rate of the servo sectors.

In the embodiment of FIG. 9A, the reading of the second (shorter) length of a first servo sector at the ID 72 is based on a first number of servo clock cycles 74 substantially synchronized to the constant data rate of the servo sector. At the OD 70, the data rate remains constant but the linear density decreases due to the increase in circumference. The reading of the second (shorter) length of a second servo sector at the OD 70 is based on the same number of clock cycles 74 used to read the first servo sector at the ID 72.

Figure 9B:
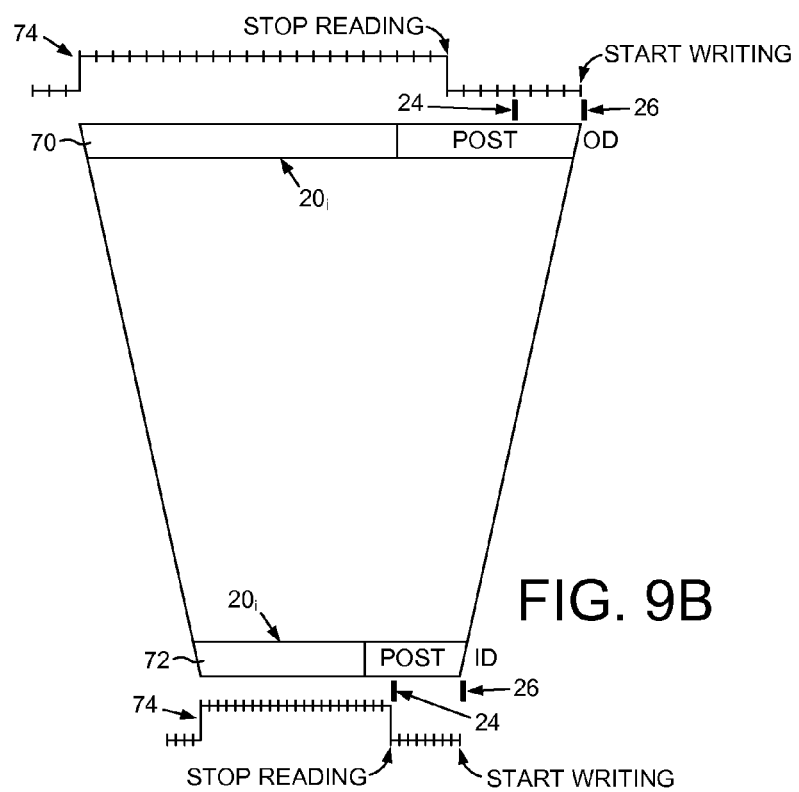

In the embodiment of FIG. 9A, the read element 24 leads the write element 26 during a write operation such that the reading is delayed at the beginning of the servo sector in order to write data up to the servo sector. In alternative embodiment shown in FIG. 9B, the write element 26 leads the read element 24 during a write operation such that reading is stopped before reaching the end of the servo sector in order to begin writing data as soon as the write element 26 clears the servo sector $20_i$. In the embodiment of FIG. 9B, the percentage of the servo sector that is unread at the end is the same at a first diameter 70 and a second diameter 72. Similar to FIG. 9A, in FIG. 9B the same number of servo clock cycles 74 are used to stop reading at the end of the servo sector at both the ID 72 and OD 70 even though the reader/writer gap changes relative to the servo sector from the ID 72 to the OD 70. In this embodiment, the data unread at the end of a servo sector is not typically required during a write operation, such as servo bursts used during a seek operation, all or part of a wedge ID, part of a Gray code track address, a postamble, RRO compensation used for a read operation, etc.

In the embodiments shown in FIGS. 9A and 9B, the first diameter 70 may be the outer diameter (OD) of the disk 16, and the second diameter 72 may be the inner diameter (ID) of the disk 16. In an alternative embodiment, the disk may comprise a plurality of servo zones, wherein the data rate of each servo sector is constant within each servo zone, but changes between the zones from the ID to the OD. In this embodiment, the first diameter 70 may be at the OD of a servo zone, and the second diameter 72 may be at the ID of a servo zone.

In one embodiment, stopping the writing of data and starting the reading of a servo sector in FIG. 9A (and stopping the reading and starting the writing of data in FIG. 9B) is controlled relative to a servo gate. In one embodiment, the servo gate defines a window which enables the reading of a servo sector, wherein the writing of data during a write operation (at the beginning or end of a servo sector) may be controlled based on a number of servo clock cycles relative to the servo gate as illustrated in FIGS. 9A and 9B.

Any suitable control circuitry may be employed to implement the flow diagrams in the embodiments of the present invention, such as any suitable integrated circuit or circuits. For example, the control circuitry may be implemented within a read channel integrated circuit, or in a component separate from the read channel, such as a disk controller, or certain operations described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into an SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

What is claimed is:

1. A disk drive comprising:
   a disk comprising a plurality of servo tracks defined by servo sectors;
   a head comprising a read element offset linearly from a write element by a gap such that when the disk rotates the read element reaches a servo sector before the write element; and
   control circuitry operable to:
     during a first operation, read a first length of a beginning of the servo sector; and
     during a write operation, read a second length of the beginning of the servo sector shorter than the first length to enable data to be written while the read element is over at least part of the servo sector.

2. The disk drive as recited in claim 1, wherein a difference between the first length and the second length is substantially equal to the gap.

3. The disk drive as recited in claim 1, wherein the first operation is a seek operation to seek the head to a target data track defined by the servo tracks.

4. The disk drive as recited in claim 1, wherein the first operation is a read operation.

5. The disk drive as recited in claim 1, wherein the first operation comprises a resync operation after aborting the write operation.

6. The disk drive as recited in claim 1, wherein:
   the beginning of the servo sector comprises a servo preamble;
   the first length comprises a first segment of the servo preamble; and
   the second length comprises a second segment of the servo preamble shorter than the first segment.

7. The disk drive as recited in claim 1, wherein:
   the beginning of the servo sector comprises a first sync mark and a second sync mark;
   during the first operation, the control circuitry is operable to read both the first and second sync marks; and
   during the write operation, the control circuitry is operable to read the second sync mark without reading the first sync mark.

8. The disk drive as recited in claim 1, wherein:
   the beginning of the servo sector comprises a high order Gray code address and a low order Gray code address;
   during the first operation, the control circuitry is operable to read both the high order Gray code address and the low order Gray code address; and
   during the write operation, the control circuitry is operable to read the low order Gray code address without reading the high order Gray code address.

9. The disk drive as recited in claim 1, wherein:
   the beginning of the servo sector comprises at least part of a wedge ID that identifies the servo sector;
   during the first operation, the control circuitry is operable to read the wedge ID; and
   during the write operation, the control circuitry is operable to not read the at least part of the wedge ID.

10. A disk drive comprising:
    a disk comprising a plurality of servo tracks defined by servo sectors recorded at a constant data rate over at least part of the disk from a first diameter to a second diameter;
    a head comprising a read element offset linearly from a write element by a gap; and
    control circuitry operable to:
      during a first read operation at the first diameter, read a first length of a first servo sector;
      during a first write operation at the first diameter, read a second length of the first servo sector;
      during a second read operation at the second diameter, read the first length of a second servo sector;
      during a second write operation at the second diameter, read the second length of the second servo sector,
      wherein the second length is shorter than the first length.

11. The disk drive as recited in claim 10, wherein the difference between the first length and the second length is substantially equal to the gap at the first diameter.

12. The disk drive as recited in claim 10, wherein the control circuitry is operable to read the first length of the servo sector to perform a resync operation when the first write operation is aborted.

13. The disk drive as recited in claim 10, wherein the second length of the servo sector comprises an ending part of the servo sector such that a beginning part of the servo sector is not read.

14. The disk drive as recited in claim 10, wherein the second length of the servo sector comprises a beginning part of the servo sector such that an ending part of the servo sector is not read.

15. The disk drive as recited in claim 10, wherein the control circuitry is further operable to:
   enable the reading of the second length of the first servo sector based on a first number of servo clock cycles substantially synchronized to the constant data rate; and
   enable the reading of the second length of the second servo sector based on the first number of servo clock cycles substantially synchronized to the constant data rate.

16. A method of operating a disk drive, the disk drive comprising a disk comprising a plurality of servo tracks defined by servo sectors, and a head comprising a read element offset linearly from a write element by a gap such that when the disk rotates the read element reaches a servo sector before the write element, the method comprising:
   during a first operation, reading a first length of a beginning of the servo sector; and
   during a write operation, reading a second length of the beginning of the servo sector shorter than the first length to enable data to be written while the read element is over at least part of the servo sector.

17. The method as recited in claim 16, wherein a difference between the first length and the second length is substantially equal to the gap.

18. The method as recited in claim 16, wherein the first operation is a seek operation to seek the head to a target data track defined by the servo tracks.

19. The method as recited in claim 16, wherein the first operation is a read operation.

20. The method as recited in claim 16, wherein the first operation comprises a resync operation after aborting the write operation.

21. The method as recited in claim 16, wherein:
   the beginning of the servo sector comprises a servo preamble;
   the first length comprises a first segment of the servo preamble; and
   the second length comprises a second segment of the servo preamble shorter than the first segment.

22. The method as recited in claim 16, wherein:
   the beginning of the servo sector comprises a first sync mark and a second sync mark;
   during the first operation, further comprising reading both the first and second sync marks; and
   during the write operation, further comprising reading the second sync mark without reading the first sync mark.

23. The method as recited in claim 16, wherein:
   the beginning of the servo sector comprises a high order Gray code address and a low order Gray code address;
   during the first operation, further comprising reading both the high order Gray code address and the low order Gray code address; and
   during the write operation, further comprising reading the low order Gray code address without reading the high order Gray code address.

24. The method as recited in claim 16, wherein:
   the beginning of the servo sector comprises at least a part of a wedge ID that identifies the servo sector;
   during the first operation, further comprising reading the wedge ID; and
   during the write operation, further comprising not reading the at least part of the wedge ID.

25. A method of operating a disk drive comprising, the disk drive comprising a disk comprising a plurality of servo tracks defined by servo sectors recorded at a constant data rate over at least part of the disk from a first diameter to a second diameter, and a head comprising a read element offset linearly from a write element by a gap, the method comprising:
   during a first read operation at the first diameter, reading a first length of a first servo sector;
   during a first write operation at the first diameter, reading a second length of the first servo sector;
   during a second read operation at the second diameter, reading the first length of a second servo sector;
   during a second write operation at the second diameter, reading the second length of the second servo sector,
   wherein the second length is shorter than the first length.

26. The method as recited in claim 25, wherein the difference between the first length and the second length is substantially equal to the gap at the first diameter.

27. The method as recited in claim 25, further comprising reading the first length of the servo sector to perform a resync operation when the first write operation is aborted.

28. The method as recited in claim 25, wherein the second length of the servo sector comprises an ending part of the servo sector such that a beginning part of the servo sector is not read.

29. The method as recited in claim 25, wherein the second length of the servo sector comprises a beginning part of the servo sector such that an ending part of the servo sector is not read.

30. The method as recited in claim 25, further comprising:
   enabling the reading of the second length of the first servo sector based on a first number of servo clock cycles substantially synchronized to the constant data rate; and
   enabling the reading of the second length of the second servo sector based on the first number of servo clock cycles substantially synchronized to the constant data rate.

* * * * *